US010664496B2

(12) United States Patent
Hanaoka et al.

(10) Patent No.: US 10,664,496 B2
(45) Date of Patent: May 26, 2020

(54) COMPUTER SYSTEM

(71) Applicant: Hitachi, Ltd., Tokyo (JP)

(72) Inventors: Miyuki Hanaoka, Tokyo (JP); Shinichi Kawamoto, Tokyo (JP); Satoshi Katsunuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 804 days.

(21) Appl. No.: 15/303,236

(22) PCT Filed: Jun. 18, 2014

(86) PCT No.: PCT/JP2014/066112
§ 371 (c)(1),
(2) Date: Oct. 11, 2016

(87) PCT Pub. No.: WO2015/193988
PCT Pub. Date: Dec. 23, 2015

(65) Prior Publication Data
US 2017/0039263 A1 Feb. 9, 2017

(51) Int. Cl.
G06F 7/00 (2006.01)
G06F 17/00 (2019.01)
G06F 16/28 (2019.01)
G06F 16/23 (2019.01)
(Continued)

(52) U.S. Cl.
CPC ........ G06F 16/282 (2019.01); G06F 11/3006 (2013.01); G06F 11/3452 (2013.01);
(Continued)

(58) Field of Classification Search
CPC .... G06F 16/2462; G06F 16/282; G06F 16/23; G06F 16/27; G06F 17/30589;
(Continued)

(56) References Cited

U.S. PATENT DOCUMENTS 5,721,692 A * 2/1998 Nagaya ................ F41G 7/2226
342/179
6,295,527 B1 * 9/2001 McCormack ....... H04L 41/0213
(Continued)

FOREIGN PATENT DOCUMENTS

JP 08-083206 A 3/1996
JP 2000-148779 A 5/2000

OTHER PUBLICATIONS

International Search Report of PCT/JP2014/066112 dated Aug. 5, 2015.

Primary Examiner — Hasanul Mobin
(74) Attorney, Agent, or Firm — Mattingly & Malur, PC

(57) ABSTRACT

A computer system, comprising a plurality of computers; and a management computer, wherein a plurality of data stores which store data obtained from a data source and having differing attributes, wherein the management computer has a request allocation unit and holds metadata management information. The request allocation unit is configured to: refer to the metadata management information to select a candidate data store based on analysis results of the data obtaining request including the time attribute of the requested data; determine whether the requested data can be obtained from the candidate data store; determine a data store to which to issue a request for obtaining the requested data; and issue the request to the determined data store.

8 Claims, 13 Drawing Sheets

(51) Int. Cl.
*G06F 16/27* (2019.01)
*G06F 16/2458* (2019.01)
*H04L 29/08* (2006.01)
*H04N 21/00* (2011.01)
*G06F 11/30* (2006.01)
*G06F 11/34* (2006.01)

(52) U.S. Cl.
CPC .......... *G06F 16/23* (2019.01); *G06F 16/2462* (2019.01); *G06F 16/27* (2019.01); *H04L 67/1023* (2013.01); *H04L 67/325* (2013.01); *H04N 21/00* (2013.01)

(58) Field of Classification Search
CPC ......... G06F 17/30536; G06F 17/30345; G06F 17/30575
USPC ........................................................ 707/698
See application file for complete search history.

(56) References Cited

U.S. PATENT DOCUMENTS

| | | | | |
|---|---|---|---|---|
| 7,356,679 B1 * | 4/2008 | Le | ...................... | G06F 9/45558 713/1 |
| 7,865,485 B2 * | 1/2011 | Mullick | .............. | G06F 16/1774 707/704 |
| 8,463,272 B2 * | 6/2013 | Yamamoto | ............ | H04W 36/22 370/328 |
| 2004/0002049 A1 * | 1/2004 | Beavers | ................... | G09B 5/00 434/350 |
| 2004/0133573 A1 * | 7/2004 | Miloushev | ............... | G06F 16/10 |
| 2004/0133577 A1 * | 7/2004 | Miloushev | .......... | G06F 11/1076 |
| 2005/0066095 A1 * | 3/2005 | Mullick | .............. | G06F 16/1774 710/200 |
| 2007/0079082 A1 * | 4/2007 | Gladwin | ............. | G06F 11/1076 711/154 |
| 2007/0240203 A1 * | 10/2007 | Beck | ....................... | G06F 21/33 726/4 |
| 2009/0094318 A1 * | 4/2009 | Gladwin | ............. | H04L 67/1097 709/203 |
| 2010/0023524 A1 * | 1/2010 | Gladwin | ............... | G06F 3/0617 707/E17.032 |
| 2010/0145917 A1 * | 6/2010 | Bone | .................... | G06F 16/122 707/694 |
| 2014/0108515 A1 * | 4/2014 | Stawikowski | ........ | H04L 67/025 709/203 |
| 2015/0113537 A1 * | 4/2015 | Bourbonnais | ......... | G06F 9/5083 718/103 |

* cited by examiner

REAL TIME STATISTICAL DATA_METADATA 301

| PROCESS NAME (401) | COLUMN NAME (402) | AGGREGATION CONTENT (403) | AGGREGATION UNIT TIME (404) | RETENTION TIME (405) |
|---|---|---|---|---|
| aggregate | util | sum (packet.size) | 1sec | 1min |
| aggregate | numpackets | count (paket) | 1sec | 1min |

*FIG. 4*

HISTORY STATISTICAL DATA_METADATA 302

| TABLE NAME (501) | COLUMN NAME (502) | AGGREGATION CONTENT (503) | TIME INTERVAL (504) | AGGREGATION UNIT TIME (505) |
|---|---|---|---|---|
| aggregate | util | sum (packet.size) | 2013/01/01 00:00:00-2014/03/04 13:16:20 | 1sec |
| aggregate | numpackets | count (paket) | 2013/03/01 00:00:00-2014/03/04 13:16:20 | 1sec |

*FIG. 5*

RAW DATA_METADATA 303

1 line for 1 packet
schema: '<time>,<srcip>,<dstip>,<srcport>,<dstport>,<size>'

*FIG. 6*

```
SETTING FILE
{
  "realtime statistics": {
    "timerange": "1 min",
    "data": [
      { "proc": "aggregate", "column": "util",
        "value": "sum(packet.size)", "aggregate unit": "1 sec" },
      { "proc": "aggregate", "column": "numpackets",
              "value": "count(packetsize)", "aggregate unit": "1 sec" }
    ]
  },
  "historical statistics": {
    "data": [
      { "table": "aggregate", "column": "util",
              "value": "sum(packet.size)", "aggregate unit": "1 sec" },
      { "table": "aggregate", "column": "numpackets",
              "value": "count(packetsize)", "aggregate unit": "1 sec" }
    ]
  },
  "raw data": {
    "delimiter": "¥n",
    "format": "<time>,<srcip>,<dstip>,<srcport>,<dstport>,<size>"
  }
}
```

*FIG. 8*

```
SETTING COMMAND

CREATE DATASOURCE_METADATA FOR realtime_statistic
  ("aggregate", "util", "sum(packet.size)", "1sec"),
  ("aggregate", "numpackets", "count(packet)", "1sec")
  ...
```

*FIG. 9*

```
SELECT sum(packet_size) aggregated by 1sec
  WHERE time = now
```

*FIG. 13A*

```
SELECT sum(packet_size)  aggregated by 1sec
  WHERE time BETWEEN (now – 1min) AND now
```

*FIG. 13B*

```
SELECT sum(packet_size) aggregated by 1sec
  WHERE time BETWEEN "2014/02/01 19:00:00" AND "2014/02/01 19:01:00"
```

*FIG. 13C*

```
SELECT sum(packet_size) aggregated by 1sec
  WHERE time BETWEEN (now – 1hour) AND now
```

*FIG. 13D*

```
SELECT sum(packet_size) aggregated by 1min
  WHERE time BETWEEN "2014/02/01 19:00:00" AND "2014/02/01 19:10:00"
```

*FIG. 13E*

```
SELECT sum(packet_size) aggregated by 1msec
  WHERE time BETWEEN "2014/02/01 19:00:00" AND "2014/02/01 19:10:00"
```

*FIG. 13F*

```
SELECT packet_sip, packet_dip, packet_sport, packet_dport, packet_size
  WHERE time BETWEEN "2014/02/01 19:00:00" AND "2014/02/01 19:10:00"
```

*FIG. 13G*

COMPUTER SYSTEM

BACKGROUND OF THE INVENTION

The present invention relates to a computer system and a management method that manages access to a plurality of types of data necessary for monitoring a system.

Virtualization technologies have become increasingly in wide use for networks, and it has become increasingly complex to monitor networks. Thus, in a network monitoring system, there is a need to have various types of detailed data in order to perform a network monitoring process and a fault analysis process. More specifically, there is a need to have data aggregated in real time and history data.

Thus, in a network monitoring system, various types of data are stored in a data store. The user can obtain data from the data store according to the monitoring process.

A technique such as the one disclosed in JP H8-83206 A, for example, is one known method for obtaining various types of data. JP H8-83206 A discloses a configuration of being "provided with: an inquiry issuing unit 11a that issues an inquiry using a database language from a client computer 10-1; a DBMS server group 23 that manages a plurality of different types of databases using a server computer 13; a non-DBMS server group 24 that manages a plurality of different types of data; and a multimedia database access unit 14 that converts the inquiry from the inquiry issuing unit 11a to a database language unique to the corresponding DBMS or converts the inquiry to a unique access method, issues an access request to the DBMS server group 23 or the non-DBMS server group 24, and returns the access results to the client computer 10-1, a multimedia database 15 constituted of a plurality of different types of DBMSs and non-DBMSs being accessed in a standard manner by a database language." In this manner, it is possible to access multimedia data including a plurality of types of databases according to one standard from an application on a client computer.

SUMMARY OF THE INVENTION

In typical conventional systems, logs are stored as is in a data store. Thus, if aggregated data is needed, the computer receiving the request needs to execute two processes including a search process and an aggregation process. This has meant that data could not be obtained efficiently.

One possible method to solve the above problem is to construct a data store for each aggregation process. However, constructing a data store for each aggregation process would increase the complexity of managing a data store. Thus, the user cannot judge which data store he/she should obtain the data from.

According to the technique disclosed in JP H8-83206 A, it is possible to obtain data from a plurality of databases or non-databases that manage different types of data, but data cannot be obtained efficiently in a computer system that requires complex data management. Also, the user needs to know in advance the attributes of data stored in the data store, but it would be difficult to know the attributes of the data stored in the data store in a computer system having a plurality of data stores that are dynamically updated and manage a plurality of pieces of data for each aggregation process.

An object of the present invention is to provide a system and a method by which it is possible to identify an appropriate data store and obtain data from the data store without the user needing to know attributes of data stored in the data store, and in particular, time attributes.

The present invention can be appreciated by the description which follows in conjunction with the following figures, wherein: a computer system comprises a plurality of computers; and a management computer. Each of the plurality of computers has a first processor, a first memory coupled to the first processor, and a first network interface coupled to the first processor. The management computer has a second processor, a second memory coupled to the second processor, and a second network interface coupled to the second processor. A plurality of data stores are formed by using the plurality of computers in the computer system. Each of the plurality of data stores data obtained from a data source and having differing attributes. The management computer has a request allocation unit configured to receive a data obtaining request for obtaining requested data from the plurality of data stores and determine at least one data store from which to obtain the requested data by analyzing the data obtaining request. The management computer holds metadata management information including a time attribute of data stored in each of the plurality of data stores. The request allocation unit is configured to: refer to the metadata management information to select at least one candidate data store based on analysis results of the data obtaining request in a case of receiving the data obtaining request including the time attribute of the requested data; determine whether the requested data can be obtained from the at least one candidate data store; determine at least one data store to which to issue a request for obtaining the requested data based on the determination results; and issue the request to the determined data store.

According to an aspect of the present invention, in the computer system having a plurality of data stores that store data having different attributes, a management computer can determine from which data store, among the plurality of data stores, to obtain the requested data on the basis of the given data obtaining request.

BRIEF DESCRIPTION OF THE DRAWINGS

The present invention can be appreciated by the description which follows in conjunction with the following figures, wherein:

FIG. 4 is an explanatory diagram for showing one example of real time statistical data_metadata of Embodiment 1;

FIG. 5 is an explanatory diagram for showing one example of history statistical data_metadata of Embodiment 1;

FIG. 6 is an explanatory diagram for showing one example of raw data_metadata of Embodiment 1;

FIG. 8 is an explanatory diagram for showing one example of a setting file for setting metadata in a metadata_database of Embodiment 1;

FIG. 9 is an explanatory diagram for showing one example of a setting command for setting metadata in the metadata_database of Embodiment 1;

FIGS. 13A, 13B, 13C, 13D, 13E, 13F, and 13G are explanatory diagrams for showing examples of data obtaining requests of Embodiment 1;

DETAILED DESCRIPTION OF THE PREFERRED EMBODIMENTS

Below, embodiments of the present invention will be described with reference to the drawings.

Embodiment 1

Figure 1:
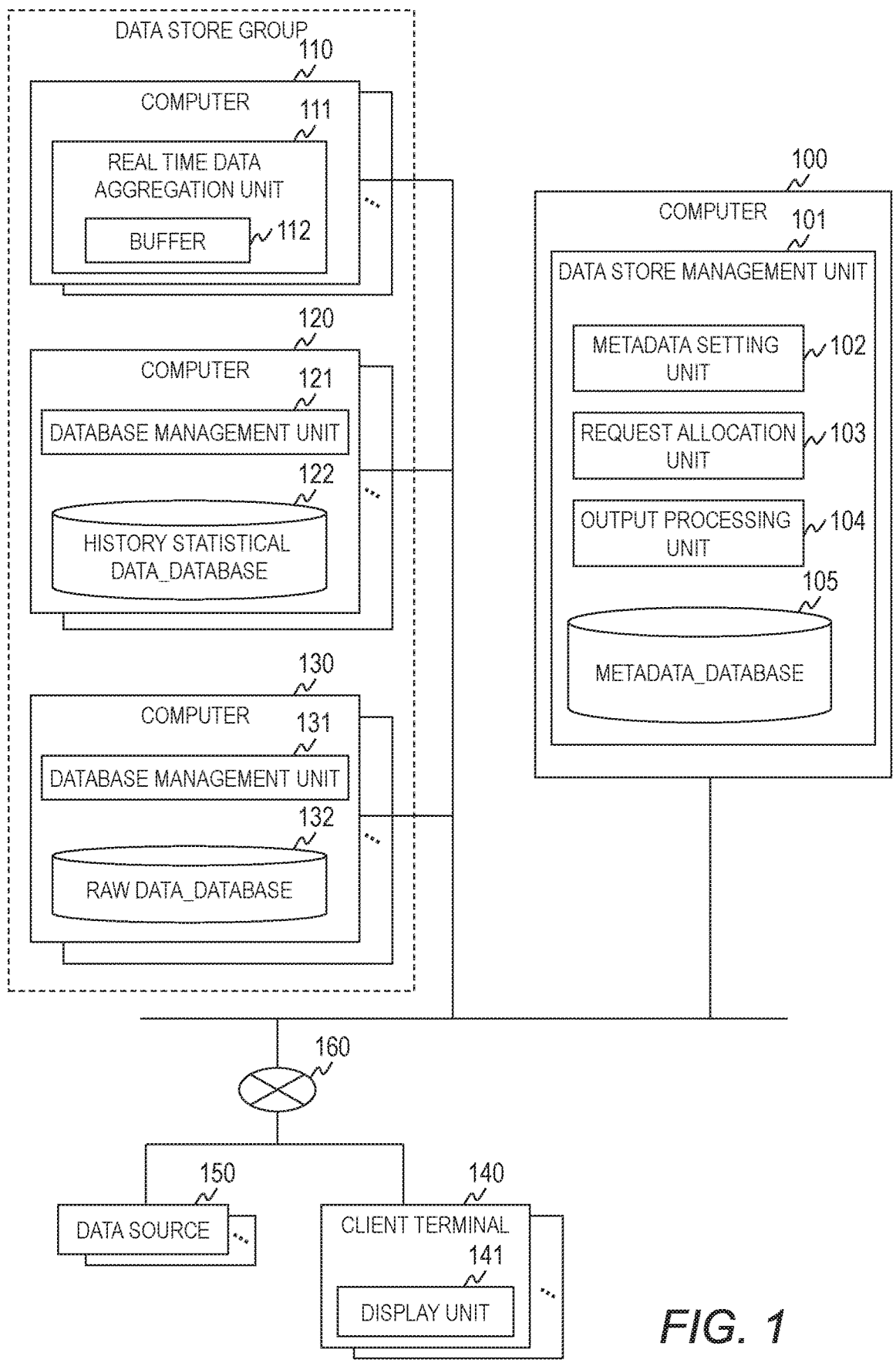
FIG. 1 is a block diagram for showing a configuration example of a computer system of Embodiment 1.

FIG. 1 is a block diagram for showing a configuration example of a computer system of Embodiment 1.

The computer system includes a plurality of computers 100, 110, 120, and 130 and a plurality of client terminals 140.

The computer 100, the plurality of computers 110, the plurality of computers 120, the plurality of computers 130, and the plurality of client terminals 140 are connected to each other through a network 160. The network 160 may take any form as long as it enables communication between the computer 100, the plurality of computers 110, 120, and 130, and the plurality of client terminals 140. The network type may be a WAN, a LAN, or the like, and the network connection mode may be wireless or wired, for example.

The client terminal 140 is a computer used by the user, and has hardware such as a processor (not shown), memory (not shown), and a network interface (not shown). The client terminal 140 runs a display unit 141 for displaying data and the like with reference to various data. The user transmits a data obtaining request to the computer 100 and inputs various information using the display unit 141.

Each of the plurality of computers 110, 120, and 130 is a computer that constitutes a data store that stores various types of data. In the present embodiment, the plurality of computers 110 constitute one or more data stores, the plurality of computers 120 constitute one or more data stores, and the plurality of computers 130 constitute one or more data stores. In the present embodiment, the plurality of data stores are managed as one group of data stores.

Data obtained from a data source 150 is managed in the data store. Here, the data source 150 signifies a source from which data managed in the group of data stores is obtained. In the case of a group of data stores that manage server operation logs in a data center, for example, the data center corresponds to the data source 150. In the case of a group of data stores that manage measurement values from a sensor, for example, the sensor corresponds to the data source 150. In the case of a group of data stores that manage a network state, for example, switches and the like constituting the network correspond to the data source 150.

Each of the plurality of computers 110 obtains real time data from the data source 150, and manages real time statistical data calculated using obtained real time data. In other words, each computer 110 realizes a data store in which real time statistical data is stored. Each computer 110 has a real time data aggregation unit 111.

The real time data aggregation unit 111 manages the data store in which real time statistical data is stored. Specifically, the real time data aggregation unit 111 calculates real time statistical data by aggregating real time data obtained from the data source 150 every prescribed aggregation unit time and stores the real time statistical data in a buffer 112, according to a predetermined aggregation process. The real time data aggregation unit 111 sets a retention time as a parameter for determining the time range during which the real time statistical data is stored in the buffer 112. The buffer 112 stores real time statistical data from the current time to a time when the retention time is reached.

The real time data aggregation unit 111 generates the real time statistical data using the real time data and stores the generated real time statistical data in the computer 120. In a case of receiving a request from the computer 100, the real time data aggregation unit 111 read the real time statistical data stored in the buffer 112 according to the request, and transmits the read real time statistical data to the computer 100 as a response.

Each of the plurality of computers 120 manages the history of the real time statistical data. In other words, each computer 120 realizes a data store in which the history of the real time statistical data is stored. Each computer 120 has a database management unit 121 and a history statistical data_database 122. In the description below, the history of the real time statistical data is also referred to as history statistical data.

The history statistical data_database 122 stores history statistical data. The database management unit 121 manages the data store in which history statistical data is stored.

Specifically, the database management unit 121 stores real time statistical data received from the real time data aggregation unit 111 in the real time statistical data_database 122. Also, in a case of receiving a request from the computer 100, the database management unit 121 reads the history statistical data from the history statistical data_database 122 according to the request, and transmits the read history statistical data to the computer 100 as a response.

The history statistical data may be a history of data other than the real time statistical data. For example, the database management unit 121 may obtain data from the data source 150 and store statistical data, calculated by executing a prescribed statistical process, as the history statistical data. Also, the database management unit 121 may obtain raw data from the computer 130 to be described later and store statistical data, calculated by executing a prescribed statistical process, as the history statistical data.

Each of the plurality of computers 130 manages raw data obtained from the data source 150. Here, the raw data is real time data obtained from the data source 150. In other words, each computer 130 realizes a data store in which raw data is stored. Each computer 130 has a database management unit 131 and a raw data_database 132.

The raw data_database 132 stores past to current raw data. The database management unit 131 manages the data store in which raw data is stored.

Specifically, the database management unit 131 obtains the raw data from the data source 150, and stores the obtained raw data in the raw data_database 132. Also, in a case of receiving a request from the computer 100, the database management unit 131 reads the raw data from the raw data_database 132 according to the request, and transmits the read raw data to the computer 100 as a response.

As described above, in each data store constituting the group of data stores of Embodiment 1, data having differing attributes such as aggregation contents, the aggregation unit time, and retention time is managed.

The computer 100 identifies at least one candidate data store from which data is to be obtained on the basis of a data obtaining request transmitted from the display unit 141. In the description below, the identified candidate data store is also referred to as a candidate data store. The computer 100 determines whether it is possible to obtain data from the candidate data store, and determines the data store from which the data is to be obtained on the basis of the determination results. The computer 100 has a data store management unit 101.

The data store management unit 101 manages an access process performed on a data store included in the group of data stores. The data store management unit 101 includes a metadata setting unit 102, a request allocation unit 103, an output processing unit 104, and a metadata_database 105.

The metadata setting unit 102 sets metadata indicating attributes of data stored in the data store. The request allocation unit 103, in a case of receiving a data obtaining request from the display unit 141, identifies the data store from which the data being requested is to be obtained, and issues a request to the identified data store. The output processing unit 104 generates response information using data obtained from the data store and transmits the generated response information to the display unit 141.

The metadata_database 105 stores metadata for managing attributes of data stored in the data store.

Figure 2:
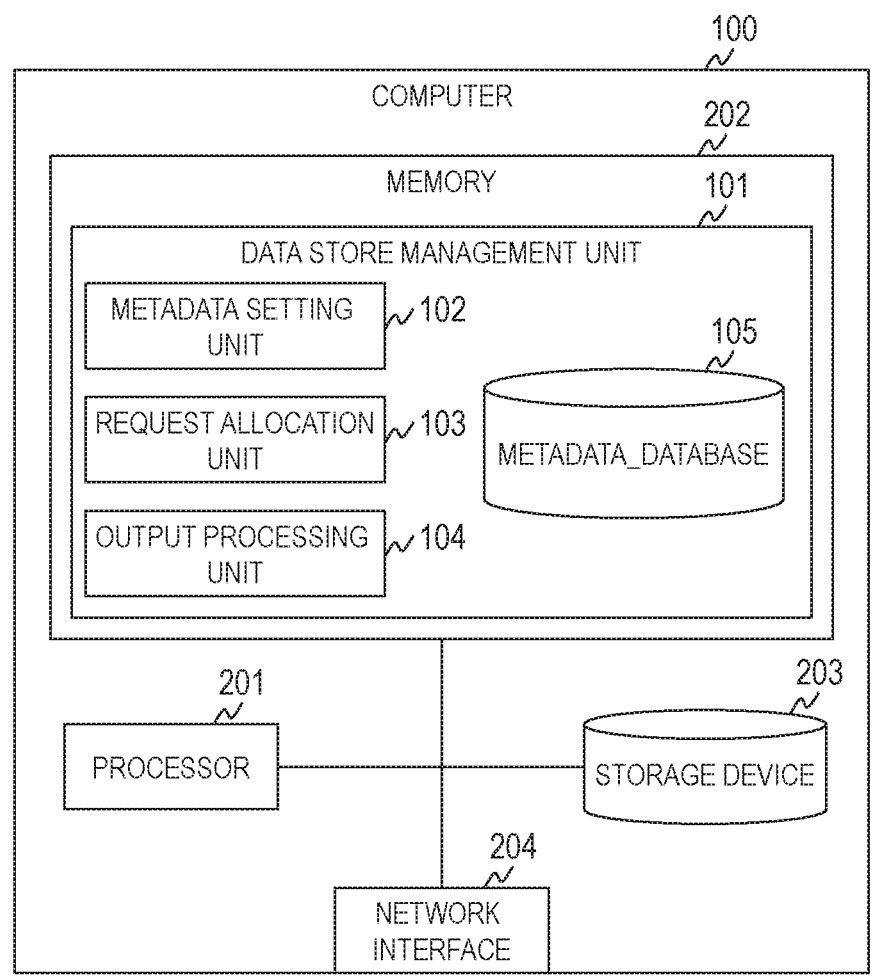
FIG. 2 is a block diagram for showing an example of a hardware configuration and a software configuration of a computer of Embodiment 1.

FIG. 2 is a block diagram for showing an example of a hardware configuration and a software configuration of the computer 100 of Embodiment 1.

The computer 100 has a processor 201, memory 202, a storage device 203, and a network interface 204.

The processor 201 executes programs stored in the memory 202. By the processor 201 executing programs, the functions of the computer 100 can be realized. In the description below, when explanations of processes are oriented around programs, this indicates that the programs are being executed by the processor 201.

The memory 202 stores programs to be executed by the processor 201 and various information necessary to execute such programs. The memory 202 stores programs that realize the metadata setting unit 102, the request allocation unit 103, and the output processing unit 104. Also, the memory 202 stores the metadata_database 105.

The storage device 203 stores various programs and information to be used by the computer 100. The programs and information stored in the memory 202 may be stored in the storage device 203. In such a case, the processor 201 reads in the programs and information from the storage device 203, loads the programs and information to the memory 202, and executes the programs loaded to the memory 202. The network interface 204 is an interface for connecting to the network.

The computers 110, 120, and 130 have the same hardware configuration as the computer 100. However, the programs and information stored in the memory 202 and the storage device 203 differ. Specifically, the memory 202 of the computer 110 stores programs that realize the real time data aggregation unit 111. The memory 202 of the computer 120 stores programs that realize the database management unit 121, and the storage device 203 stores the history statistical data_database 122. The memory 202 of the computer 130 stores programs that realize the database management unit 131, and the storage device 203 stores the raw data_database 132.

In the present embodiment, the data store is realized as a disk store using a storage area of the storage device 203, but the data store may be realized as a memory store using a storage area of the memory 202.

Figure 3:
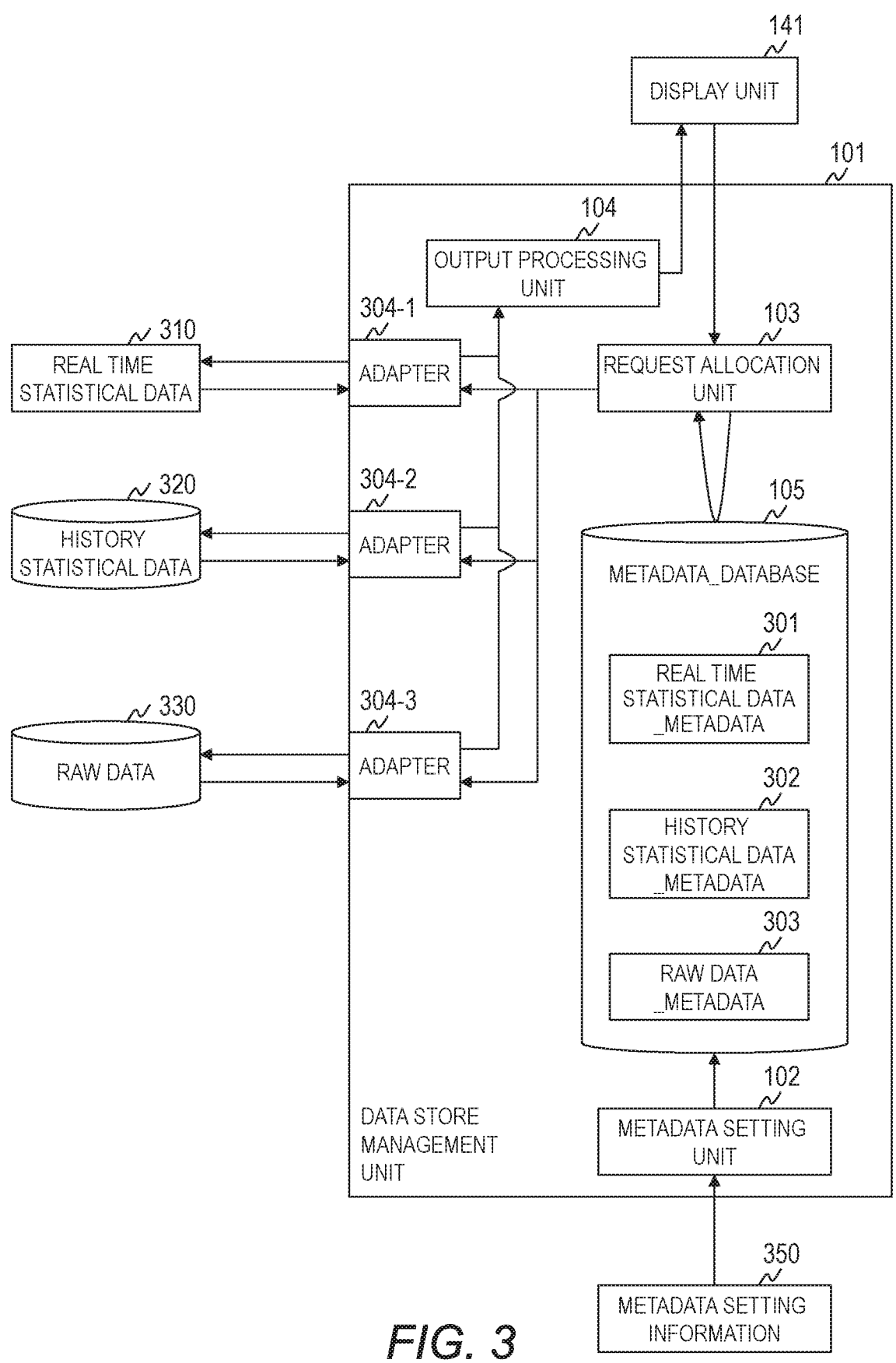
FIG. 3 is a block diagram for showing a process flow of the computer system of Embodiment 1.

FIG. 3 is a block diagram for showing a process flow of the computer system of Embodiment 1.

As shown in FIG. 3, the data store management unit 101 has a plurality of adapters 304 specialized for accessing the respective data stores. The data store management unit 101, by using each adapter 304, transmits a request to each data store and receives data from each data store.

The data store management unit 101 of Embodiment 1 has three adapters 304-1, 304-2, and 304-3. The adapter 304-1 is an adapter for obtaining the real time statistical data 310 managed by the real time data aggregation unit 111. The adapter 304-2 is an adapter for obtaining the history statistical data 320 managed by the database management unit 121. The adapter 304-3 is an adapter for obtaining the raw data 330 managed by the database management unit 131.

Metadata setting information 350 is inputted in advance to the data store management unit 101. The metadata setting unit 102 sets metadata indicating attributes of data managed in the group of data stores to the metadata_database 105 on the basis of the inputted metadata setting information 350.

In Embodiment 1, the metadata setting unit 102 sets real time statistical data_metadata 301, history statistical data_metadata 302, and raw data_metadata 303 to the metadata_database 105.

The real time statistical data_metadata 301 is metadata of real time statistical data managed by the computer 110. The history statistical data_metadata 302 is metadata of history statistical data managed by the computer 120. The raw data_metadata 303 is metadata of raw data managed by the computer 130.

Details of the real time statistical data_metadata 301, history statistical data_metadata 302, and raw data_metadata 303 in the metadata_database 105 will be described later with reference to FIGS. 4, 5, and 6.

In a case where the data store management unit 101 has received a data obtaining request from the display unit 141, it operates as follows.

First, the request allocation unit 103 analyzes the data obtaining request. The request allocation unit 103 refers to the metadata_database 105 on the basis of the analysis results and determines the data store from which to obtain the data. The request allocation unit 103 outputs a request issue instruction to the adapter 304 to access the determined data store.

In a case of receiving the request issue instruction, the adapter 304 issues a request to the data store on the basis of the request issue instruction and obtains data from the data store. The adapter 304 outputs the obtained data to the output processing unit 104.

The output processing unit 104 generates response information using the analysis results of the data obtaining request and the data inputted from each adapter. At this time, the output processing unit 104 processes the data obtained from the data store if necessary, thereby generating the data requested by the data obtaining request. The output processing unit 104 transmits the generated response information to the display unit 141.

In Embodiment 1, the request allocation unit 103 is characterized in determining the data store from which to obtain the data on the basis of the analysis results of the data obtaining request and the metadata_database 105. Also, the request allocation unit 103 is characterized in generating data requested by the data obtaining request by using the data stored in the data store.

FIG. 4 is an explanatory diagram for showing one example of the real time statistical data_metadata 301 of Embodiment 1.

The real time statistical data_metadata 301 of Embodiment 1 is data in tabular format and includes a process name 401, a column name 402, an aggregation content 403, an aggregation unit time 404, and a retention time 405. The real time statistical data_metadata 301 may include other columns besides those mentioned above.

The process name 401 is the name of an aggregation process to be executed by the real time data aggregation unit 111. The column name 402 represents content of the real time statistical data 310 aggregated by the real time data aggregation unit 111. The aggregation content 403 is the content of the aggregation process to be executed by the real time data aggregation unit 111. The aggregation content 403 stores aggregation process functions, for example. The aggregation unit time 404 is an interval of aggregation time in the aggregation process. The retention time 405 represents the time length of the real time statistical data 310 retained by the buffer 112 of the real time data aggregation unit 111.

The metadata corresponding to the first entry in FIG. 4 indicates a data store that manages, as real time statistical data 310, the usage rate calculated by totaling the sizes of packets in one-second intervals. Also, it can be seen that the usage rate from the current time to a time one minute later is stored in the data store.

The metadata corresponding to the second entry in FIG. 4 indicates a data store that manages, as real time statistical data 310, the number of packets calculated by measuring the number of packets in one-second intervals. Also, it can be seen that the number of packets from the current time to a time one minute later is stored in the data store.

FIG. 5 is an explanatory diagram for showing one example of the history statistical data_metadata 302 of Embodiment 1.

The history statistical data_metadata 302 of Embodiment 1 is data in tabular format and includes a table name 501, a column name 502, an aggregation content 503, a time interval 504, and an aggregation unit time 505. The history statistical data_metadata 302 may include other columns besides those mentioned above.

The column name 502, the aggregation content 503, and the aggregation unit time 505 are the same as the column name 402, the aggregation content 403, and the aggregation unit time 404. The table name 501 is the name of the aggregation process for aggregating the real time statistical data 310 stored as the history statistical data 320, and corresponds to the process name 401. The time interval 504 is the history period of the history statistical data 320.

The history statistical data 320 is added to the history statistical data_database 122 of the computer 120. Thus, in a case where the history statistical data 320 is added to the database management unit 121, the database management unit 121 notifies the time interval after updating to the computer 100. As a result, the time interval 504 is updated. The computer 100 may update the time interval 504 by querying the database management unit 121.

FIG. 6 is an explanatory diagram for showing one example of the raw data_metadata 303 of Embodiment 1.

The raw data_metadata 303 of Embodiment 1 is data in file format. The raw data_metadata 303 stores definition information of schemas of the raw data 330 obtained by the computer 130. The raw data_metadata 303 may store information other than the aforementioned definition information.

The present embodiment is not limited to the data format of the real time statistical data_metadata 301, history statistical data_metadata 302, and raw data_metadata 303. For example, the real time statistical data_metadata 301 and the history statistical data_metadata 302 may be data in file format. The column recorded as metadata can be set arbitrarily using the metadata setting information 350.

Figure 7:
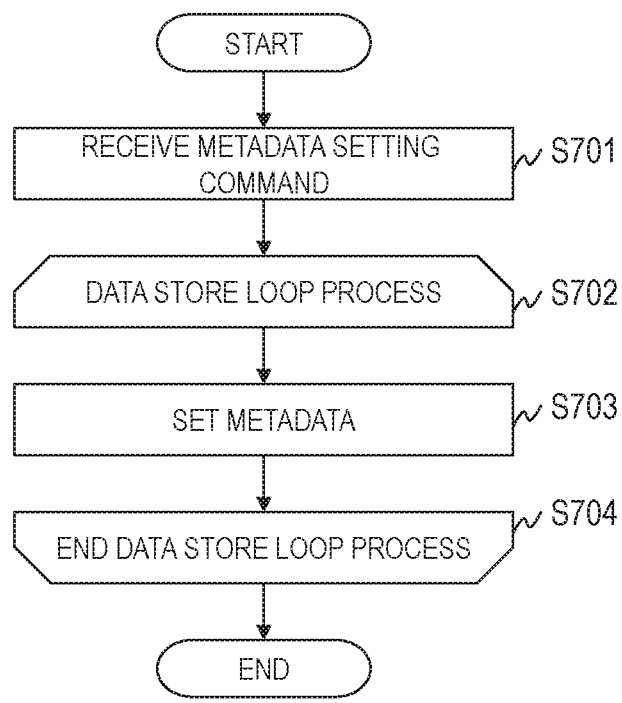
FIG. 7 is a flow chart for illustrating one example of a process executed by a metadata setting unit of Embodiment 1.

FIG. 7 is a flow chart for illustrating one example of a process executed by the metadata setting unit 102 of Embodiment 1. FIG. 8 is an explanatory diagram for showing one example of a setting file for setting metadata in the metadata_database 105 of Embodiment 1. FIG. 9 is an explanatory diagram for showing one example of a setting command for setting metadata in the metadata_database 105 of Embodiment 1.

The metadata setting unit 102 starts the process in a case of receiving a metadata setting instruction (step S701). The metadata setting instruction is inputted by a manager who operates the computer 100, a user who operates the client terminal 140, or the like.

The metadata setting instruction includes, as the metadata setting information 350, setting files, setting commands, or the like relating to data of each data store. The setting file shown in FIG. 8 or the setting command shown in FIG. 9 is included as the metadata setting information 350, for example.

The metadata setting unit 102 starts the looping process of the data store (step S702). Specifically, the metadata setting unit 102 refers to the metadata setting information 350 included in the metadata setting instruction and selects one data store to be processed.

The metadata setting unit 102 sets the metadata of the selected data store in the metadata_database 105 on the basis of the metadata setting information 350 (step S703).

In a case where the metadata setting information 350 is the setting file shown in FIG. 8 and the data store managing the real time statistical data 310 is selected, for example, the metadata setting unit 102 extracts columns from the setting file. The metadata setting unit 102 generates the real time statistical data_metadata 301 where the extracted columns has been set, in the metadata_database 105. Additionally, the metadata setting unit 102 sets a value in each column on the basis of the setting file.

The metadata setting unit 102 determines whether the setting of metadata has been completed for all data stores included in the metadata setting information 350 (step S704).

In a case where it is determined that the setting of metadata has not been completed for all data stores included in the metadata setting information 350, the metadata setting unit 102 returns to step S702, selects the next data store to be processed, and executes a similar process.

In a case where it is determined that the setting of metadata has been completed for all data stores included in the metadata setting information 350, the metadata setting unit 102 ends the process.

Figure 10:
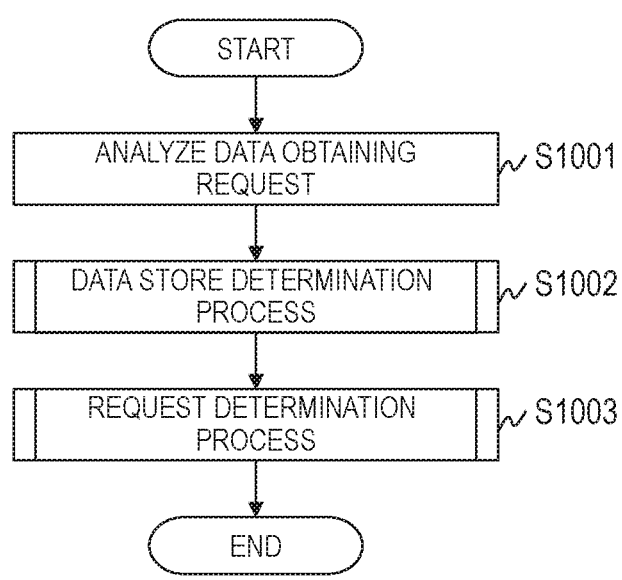
FIG. 10 is a flow chart for illustrating the summary of a process executed by a request allocation unit of Embodiment 1.

FIG. 10 is a flow chart for illustrating the summary of a process executed by the request allocation unit 103 of Embodiment 1.

The request allocation unit 103 starts the process in a case of receiving a data obtaining request from the display unit 141. The data obtaining request includes a designated time designating the time range of requested data, and attribute information of data (aggregation information). The designated time includes a start time (ts) and an end time (te), and the data attribute information includes either a process name, an aggregation unit time, and aggregation content, or a raw data schema. In the description below, the data requested by the data obtaining request is also referred to as requested data.

In the present embodiment, the designated time can be set arbitrarily. The designated time is set either as an absolute time or a relative time. In the case of an absolute time, a start time of "2014/02/01 19:00" and an end time of "2014/03/01 11:00" are included as the designated time, and in the case of a relative time, a start time of "now-1 min" and an end time of "now" are included as the designated time, for example. The current time is indicated as "now", and in the present embodiment, the current time is represented as the time when the request allocation unit 103 has started the process.

The request allocation unit 103 analyzes the data obtaining request, and obtains information for identifying the data store where the requested data is to be obtained (step S1001). Specifically, the request allocation unit 103 obtains the designated time and the data attribute information. Also, the request allocation unit 103 determines whether the designated time is a relative time or an absolute time.

The request allocation unit 103 executes a data store determination process for identifying the data store where the requested data is to be obtained on the basis of the obtained designated time (step S1002). In the data store determination process, the request allocation unit 103 determines the candidate data store on the basis of attribute of time included in each piece of metadata stored in the metadata_database 105. Details of the data store determination process will be described later with reference to FIGS. 11A and 11B.

The request allocation unit 103 executes a request determination process for determining the data store to which the request is actually to be issued (step S1003), and ends the process.

This is because there is a possibility that the requested data cannot be obtained from the candidate data store. The request allocation unit 103 determines whether or not it is possible to obtain the requested data from the candidate data store on the basis of the metadata, and determines the data store to which to actually issue the request on the basis of the determination results. Details of the request determination process will be described later with reference to FIG. 12.

Figure 11A:
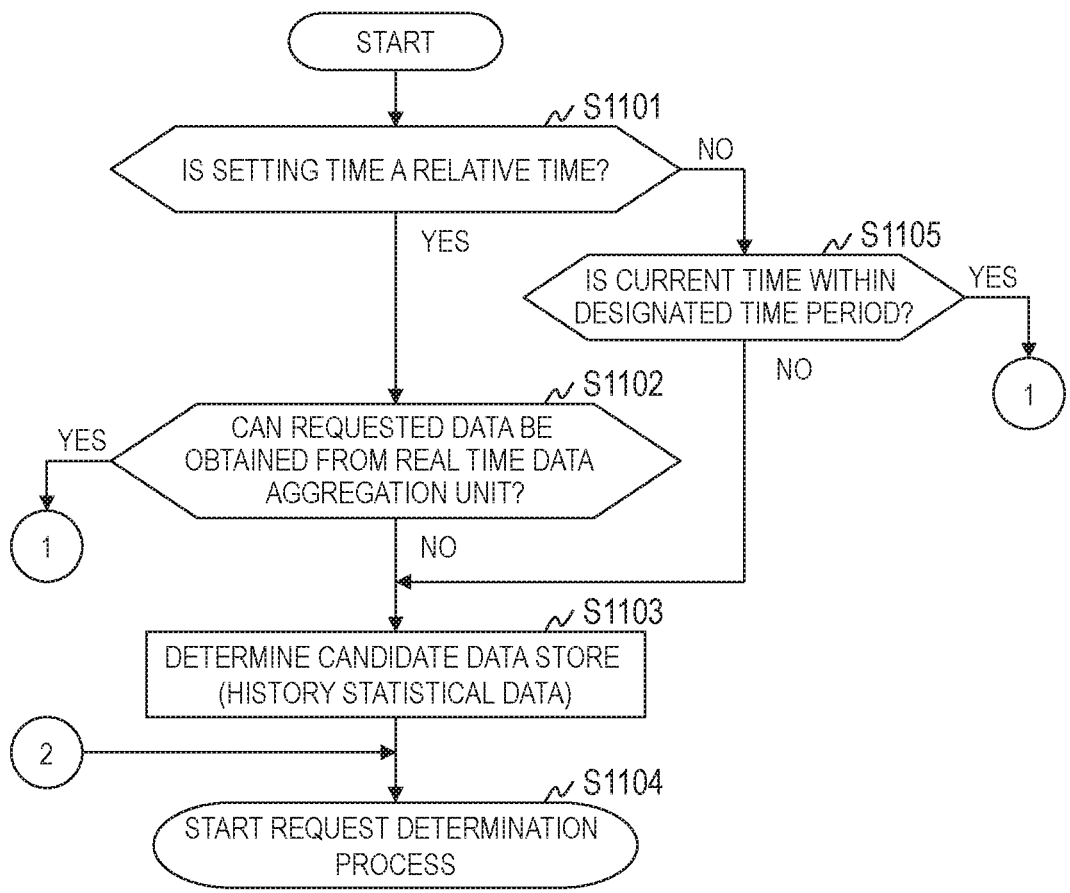
FIGS. 11A and 11B are flow charts for illustrating one example of data store determination process of Embodiment 1.
Figure 11B:
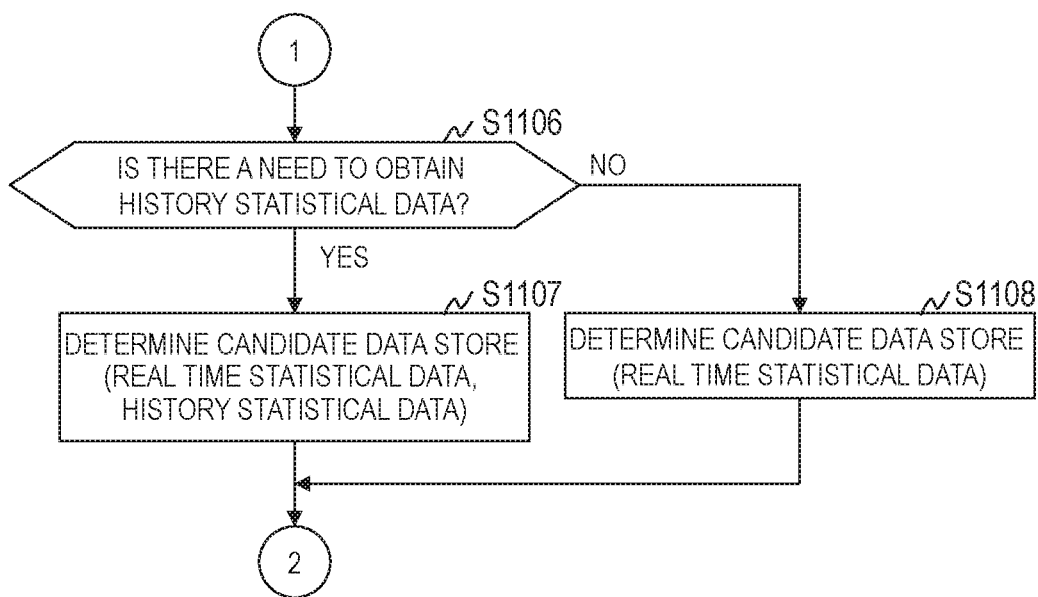

FIGS. 11A and 11B are flow charts for illustrating one example of the data store determination process of Embodiment 1.

The request allocation unit 103 determines whether the designated time is a relative time on the basis of the analysis results of the data obtaining request (step S1101).

In a case where it is determined that the designated time is a relative time, the request allocation unit 103 determines whether there is a possibility that the requested data can be obtained from the real time data aggregation unit 111 (step S1102). Specifically, the process below is executed.

The request allocation unit 103 obtains the current time. The request allocation unit 103 also refers to the real time statistical data_metadata 301 to obtain the retention time 405. The request allocation unit 103 selects one value of retention time 405 and determines whether the value satisfies the following formula (1).

(Formula 1)

$$(\text{now} - \text{rt\_range}) < \text{te} \qquad (1)$$

Here, "now" is a variable representing the current time, "rt_range" is a variable representing the selected retention time 405, and "te" is a variable representing the end time. If at least one retention time 405 satisfying formula (1) is present, then the request allocation unit 103 determines that data that can be obtained from the real time data aggregation unit 111 is present. This is because if formula (1) is satisfied, there is a possibility that the buffer 112 of the real time data aggregation unit 111 has stored therein requested data designated by the designated time.

At this time, the request allocation unit 103 assigns a flag to the real time statistical data_metadata 301. The above is the description of the process of step S1102. The request allocation unit 103 may apply a flag only to entries satisfying formula (1). In this manner, in the request determination process to be described later, it is possible to reduce the process load because it is only necessary to execute the process only on entries that have been flagged. The above is the description of the process of step S1102. The determination method used in formula (1) is only one example, and any conditions may be used as long as a similar determination can be made.

In a case where it is determined that there is no possibility of requested data being obtained from the real time data aggregation unit 111, the request allocation unit 103 determines the candidate data store to be the data store that manages the history statistical data 320 (step S1103), and then starts the request determination process (step S1104).

In a case where it is determined that there is a possibility of requested data being obtained from the real time data aggregation unit 111, the request allocation unit 103 progresses to step S1106.

In step S1101, in a case where it is determined that the designated time is an absolute time, the request allocation unit 103 obtains the current time and determines whether the current time is included in the designated time (step S1105).

In a case where it is determined that the current time is not included in the designated time, the request allocation unit 103 determines the candidate data store to be the data store that manages the history statistical data 320 (step S1103), and then starts the request determination process (step S1104).

In a case where it is determined that the current time is included in the designated time, the request allocation unit 103 progresses to step S1106.

In a case where the determination result of step S1102 is "Yes" or the determination result of step 1105 is "Yes", then the request allocation unit 103 determines whether there is a need to obtain history statistical data 320 (step S1106). Specifically, the process below is executed.

The request allocation unit obtains the current time and value of the retention time 405. The request allocation unit 103 selects one value of the retention time 405 and determines whether the value satisfies the following formula (2).

(Formula 2)

$$\text{ts} \le (\text{row} - \text{rt\_range}) \qquad (2)$$

Here, "ts" is a variable representing the start time. If at least one retention time 405 satisfying formula (2) is present, then the request allocation unit 103 determines that the history statistical data needs to be obtained. This is because if formula (2) is satisfied, not all requested data is stored in the buffer 112 of the real time data aggregation unit 111. The determination method used in formula (2) is only one example, and any conditions may be used as long as a similar determination can be made.

In a case where it is determined that there is a need to obtain the history statistical data 320, the request allocation unit 103 determines the candidate data stores to be the data store that manages the real time statistical data 310 and the data store that manages the history statistical data 320 (step S1107), and starts the request determination process (step S1104). Specifically, the process below is executed.

The request allocation unit 103 designates a time t0 that satisfies the following formula (3). The request allocation unit 103 determines the candidate data store to be the data store that manages the history statistical data 320 for requested data from ts to t0, and determines the candidate data store to be the data store that manages the real time statistical data 310 for requested data from t0 to te.

(Formula 3)

$$t0 = (\text{now} - \text{rt\_range}) \quad (3)$$

At this time, the request allocation unit 103 assigns a flag to the history statistical data_metadata 302. The above is the description of the process of step S1107. The determination method used in formula (3) is only one example, and any conditions may be used as long as a similar determination can be made.

In a case where it is determined that there is no need to obtain the history statistical data 320, the request allocation unit 103 determines the candidate data store to be the data store that manages the real time statistical data 310 (step S1108), and then starts the request determination process (step S1104).

As described above, in the data store determination process, by referring to the metadata_database 105 on the basis of a designated time included in the data obtaining request, it is possible to determine the candidate data store that issues the request. In this manner, it is possible to select an appropriate data store without the user needing to know attributes of data stored in the data store, and in particular, time attributes.

Figure 12:
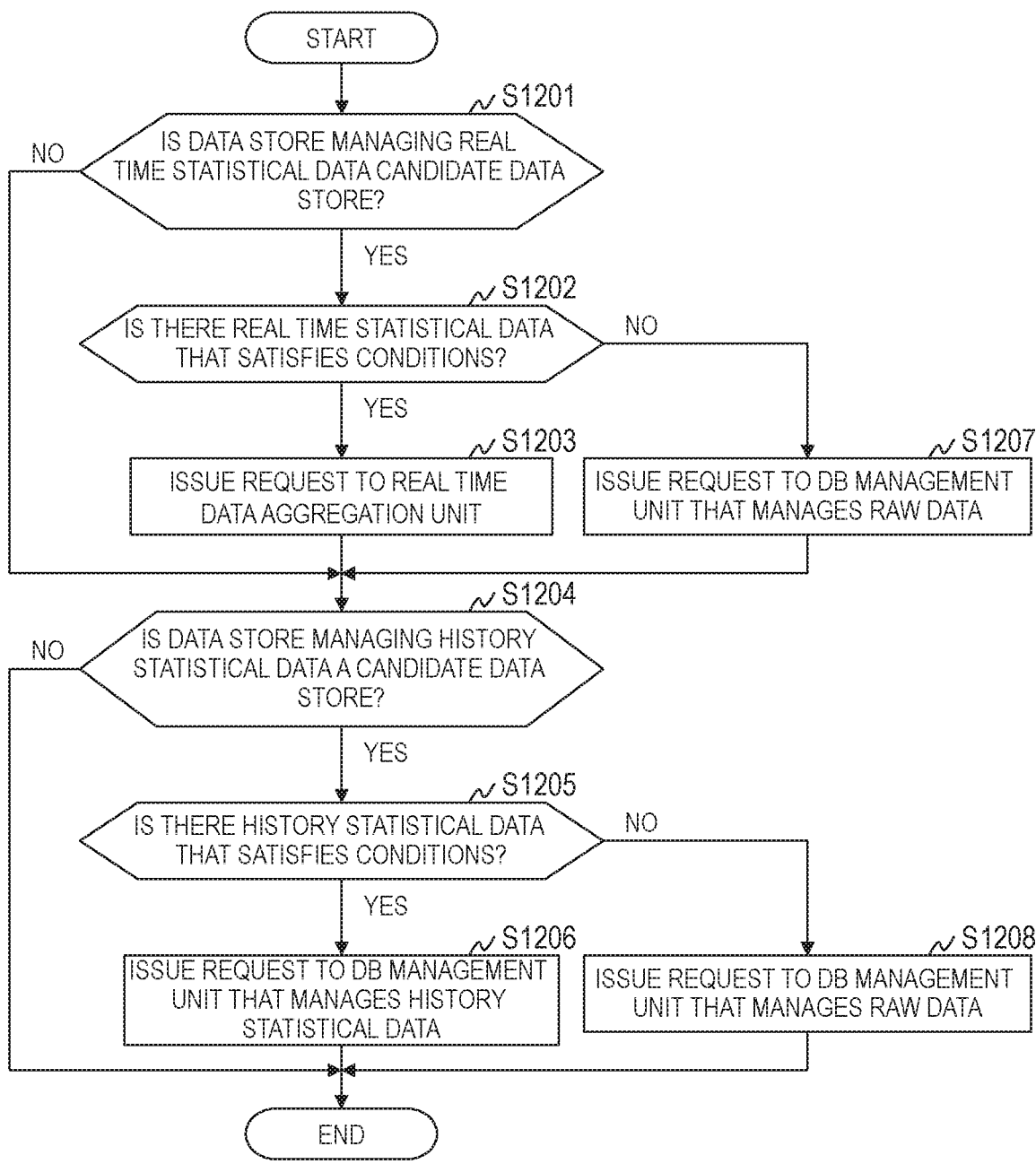
FIG. 12 is a flow chart for illustrating one example of request determination process of Embodiment 1.

FIG. 12 is a flow chart for illustrating one example of the request determination process of Embodiment 1.

The request allocation unit 103 determines whether the data store that manages the real time statistical data 310 is the candidate data store (step S1201).

Specifically, the request allocation unit 103 determines whether a flag is assigned to the real time statistical data_metadata 301.

In a case where it is determined that the data store managing the real time statistical data 310 is not the candidate data store, the request allocation unit 103 progresses to step S1204.

In a case where it is determined that the data store managing the real time statistical data 310 is the candidate data store, the request allocation unit 103 refers to the real time statistical data_metadata 301 to determine whether there is real time statistical data 310 that matches the attribute information of data included in the data obtaining request (step S1202). Specifically, the process below is executed.

First, the request allocation unit 103 determines whether the process name, aggregation content, and aggregation unit time have been obtained as attribute information of the data. In a case where the process name, aggregation content, and aggregation unit time have not been obtained, the request allocation unit 103 determines that there is no real time statistical data 310 matching the attribute information of data of the data obtaining request.

In a case where it is determined that the process name, aggregation content, and aggregation unit time have been obtained, the request allocation unit 103 searches entries in the real time statistical data_metadata 301 the process name 401 and the aggregation content 403 that match the obtained process name and the obtained aggregation content. In a case where there are no matching entries, the request allocation unit 103 determines that there is no real time statistical data 310 matching the attribute information of data of the data obtaining request.

The request allocation unit 103 determines whether the value of the aggregation unit time 404 of the searched entry is at or below the obtained aggregation unit time and within a time at which aggregation is possible. In the description below, the determination conditions above are also referred to as first determination conditions. Here, the above process will be described with an example in which the obtained aggregation unit time is "1 min".

In a case where the value of the aggregation unit time 404 of the searched entry is "1 min", the request allocation unit 103 determines that the first determination condition is satisfied.

In a case where the value of the aggregation unit time 404 of the searched entry is "30 sec", the request allocation unit 103 determines that the first determination condition is satisfied. This is because, by the request allocation unit 103 obtaining two pieces of real time statistical data 310 in which the aggregation unit time is "30 sec", and aggregating the two pieces of real time statistical data 310, it is possible to generate real time statistical data 310 of "1 min".

In a case where the value of the aggregation unit time 404 of the searched entry is "50 sec", the request allocation unit 103 determines that the first determination condition is not satisfied. This is because, it is not possible to generate real time statistical data 310 of "1 min" from real time statistical data 310 in which the aggregation unit time is "50 sec".

In other words, in a case where the value of the aggregation unit time 404 is a divisor of the obtained aggregation unit time, the request allocation unit 103 determines that the first determination condition is satisfied. The above is the description of the process of step S1202.

In a case where it is determined that real time statistical data 310 matching the attribute information of data included in the data obtaining request is present, then the request allocation unit 103 issues a request to the real time data aggregation unit 111 (step S1203) and then progresses to step S1204.

Specifically, the request allocation unit 103 outputs to the adapter 304-1 a request issue instruction including information in the searched entry. In a case where the request issue instruction is inputted, the adapter 304-1 issues a request to a prescribed real time data aggregation unit 111.

In a case where it is determined that real time statistical data 310 matching the attribute information of data included in the data obtaining request is not present, then the request allocation unit 103 issues a request to the database management unit 131 managing raw data (step S1207) and then progresses to step S1204. Specifically, the process below is executed.

The request allocation unit 103 refers to the raw data_metadata 303 and identifies the raw data_database 132 from which to obtain the requested data. At this time, the first determination conditions may be applied. The request allocation unit 103 outputs to the adapter 304-3 a request issue instruction including an identifier for the computer 130 managing the identified raw data_database 132. In a case where the request issue instruction is inputted, the adapter 304-3 issues a request to the database management unit 131 of the prescribed computer 130. The above is the description of the process of step S1207.

In step S1204, the request allocation unit 103 determines whether the data store that manages the history statistical data 320 is the candidate data store (step S1204).

Specifically, the request allocation unit 103 determines whether a flag is assigned to the history statistical data_metadata 302.

In a case where it is determined that the data store managing the history statistical data 320 is not the candidate data store, the request allocation unit 103 ends the process.

In a case where it is determined that the data store managing the history statistical data 320 is the candidate data store, the request allocation unit 103 refers to the history statistical data_metadata 302 to determine whether there is history statistical data 320 that matches the attribute information of data included in the data obtaining request (step S1205). The process of step S1205 is the same as the process of step S1202.

In a case where it is determined that history statistical data 320 matching the attribute information of data included in the data obtaining request is present, then the request allocation unit 103 issues a request to the database management unit 121 (step S1206) and then ends the process.

Specifically, the request allocation unit 103 outputs to the adapter 304-2 a request issue instruction including information in the searched entry. In a case where the request issue instruction is inputted, the adapter 304-2 issues a request to the prescribed database management unit 121.

In a case where it is determined that real time statistical data 310 matching the attribute information of data included in the data obtaining request is not present, then the request allocation unit 103 issues a request to the database management unit 131 managing raw data (step S1208) and then ends the process. The process of step S1208 is the same as the process of step S1207.

In the present embodiment, the data store determination process and the request determination process are executed separately, but the two processes may be executed simultaneously. The request allocation unit 103 executes the process of step S1205 after the process of step S1103, executes the processes of steps S1202 and S1205 after the process of step S1107, and executes the process of step S1202 after the process of step S1108, for example.

Here, specific process content of the data obtaining request and the request determination process will be described using a specific data obtaining request. In the following, it is assumed that metadata in FIGS. 4, 5, and 6.

FIGS. 13A, 13B, 13C, 13D, 13E, 13F, and 13G are explanatory diagrams for showing examples of data obtaining requests of Embodiment 1.

(Data Obtaining Request of FIG. 13A)

The start time and end time are both "now", and the designated time is a relative time. Thus, the determination result of step S1101 becomes "Yes". As a result of there being an entry that satisfies formula (1), the determination result of step S1102 becomes "Yes". As a result of the entry not satisfying formula (2), the determination result of step S1106 becomes "No". Thus, the data store manages the real time statistical data 310 is the candidate data store.

The candidate data store is the data store manages the real time statistical data 310, and thus, the determination result of step S1201 becomes "Yes". In step S1202, the process name, aggregation content, and aggregation unit time match the topmost entry of the real time statistical data_metadata 301, and thus, the determination result becomes "Yes". Also, the candidate data store is only the data store manages the real time statistical data 310, and thus, the determination result of step S1204 becomes "No".

By the results above, the request allocation unit 103 issues a request to the real time data aggregation unit 111.

(Data Obtaining Request of FIG. 13B)

The start time is "now-1 min" and the end time is "now", and the designated time is a relative time. Thus, the determination result of step S1101 becomes "Yes". As a result of there being an entry that satisfies formula (1), the determination result of step S1102 becomes "Yes". As a result of the entry not satisfying formula (2), the determination result of step S1106 becomes "No". Thus, the data store manages the real time statistical data 310 is the candidate data store.

The candidate data store is the data store manages the real time statistical data 310, and thus, the determination result of step S1201 becomes "Yes". In step S1202, the process name, aggregation content, and aggregation unit time match the topmost entry of the real time statistical data_metadata 301, and thus, the determination result becomes "Yes". Also, the candidate data store is only the data store manages the real time statistical data 310, and thus, the determination result of step S1204 becomes "No".

By the results above, the request allocation unit 103 issues a request to the real time data aggregation unit 111.

(Data Obtaining Request of FIG. 13C)

The start time is "2014/02/01 19:00:00" and the end time is "2014/02/01 19:01:00", and the designated time is an absolute time. Thus, the determination result of step S1101 becomes "No".

In a case where the current time is included in the designated time, the determination result of step S1105 becomes "Yes". As a result of the entry not satisfying formula (2), the determination result of step S1106 becomes "No". Thus, the data store manages the real time statistical data 310 is the candidate data store.

On the other hand, in a case where the current time is not included in the designated time, the determination result of step S1105 becomes "No". Thus, the data store manages the history statistical data 320 is the candidate data store.

In a case where the candidate data store is the data store manages the real time statistical data 310, the determination result of step S1201 becomes "Yes". In step S1202, the process name, aggregation content, and aggregation unit time match the topmost entry of the real time statistical data_metadata 301, and thus, the determination result becomes "Yes". Also, the candidate data store is only the data store manages the real time statistical data 310, and thus, the determination result of step S1204 becomes "No". By the results above, the request allocation unit 103 issues a request to the real time data aggregation unit 111.

In a case where the candidate data store is the data store manages the history statistical data 320, the determination result of step S1201 becomes "No" and the determination result of step S1204 becomes "Yes". In step S1205, the process name, aggregation content, and aggregation unit time match the topmost entry of the real time statistical data_metadata 301, and thus, the determination result becomes "Yes". By the results above, the request allocation unit 103 issues a request to the database management unit 121.

(Data Obtaining Request of FIG. 13D)

The start time is "now-1 hour" and the end time is "now", and the designated time is a relative time. Thus, the determination result of step S1101 becomes "Yes". As a result of there being an entry that satisfies formula (1), the determination result of step S1102 becomes "Yes". As a result of the entry satisfying formula (2), the determination result of step S1106 becomes "Yes". Thus, the data store manages the real time statistical data 310 and the data store manages the history statistical data 320 are the candidate data store. t0 becomes "now-1 min".

One of the candidate data stores is the data store manages the real time statistical data 310, and thus, the determination result of step S1201 becomes "Yes". In step S1202, the process name, aggregation content, and aggregation unit time match the topmost entry of the real time statistical data_metadata 301, and thus, the determination result becomes "Yes". Also, one of the candidate data stores is the data store managing the history statistical data 320, and thus, the determination result of step S1204 becomes "Yes". In step S1205, the process name, aggregation content, and aggregation unit time match the topmost entry of the real time statistical data_metadata 301, and thus, the determination result becomes "Yes".

By the results above, the request allocation unit 103 issues a request to the real time data aggregation unit 111, and issues a request to the database management unit 121 for requested data from "now-1 hour" to "now-1 min".

(Data Obtaining Request of FIG. 13E)

The start time is "2014/02/01 19:00:00" and the end time is "2014/02/01 19:10:00", and the designated time is an absolute time. Thus, the determination result of step S1101 becomes "No".

In a case where the current time is included in the designated time, the determination result of step S1105 becomes "Yes". As a result of the entry satisfying formula (2), the determination result of step S1106 becomes "Yes". Thus, the data store manages the real time statistical data 310 and the data store manages the history statistical data 320 are the candidate data store.

On the other hand, in a case where the current time is not included in the designated time, the determination result of step S1105 becomes "No". Thus, the data store manages the history statistical data 320 is the candidate data store.

In a case where the candidate data store is the data store manages the real time statistical data 310, the determination result of step S1201 becomes "Yes". In step S1202, the process name, aggregation content, and aggregation unit time match the topmost entry of the real time statistical data_metadata 301, and thus, the determination result becomes "Yes". In a case where the candidate store is also the data store managing the history statistical data 320, the determination result of step S1205 becomes "Yes". By the results above, the request allocation unit 103 issues a request to the real time data aggregation unit 111, and issues a request to the database management unit 121 for requested data from "2014/02/01 19:00:00" to "2014/02/01 19:09:00".

In a case where the candidate data store is only the data store manages the history statistical data 320, the determination result of step S1201 becomes "No" and the determination result of step S1204 becomes "Yes". In step S1205, the process name, aggregation content, and aggregation unit time match the topmost entry of the real time statistical data_metadata 301, and thus, the determination result becomes "Yes". By the results above, the request allocation unit 103 issues a request to the database management unit 121.

(Data Obtaining Request of FIG. 13F)

The start time is "2014/02/01 19:00:00" and the end time is "2014/02/01 19:10:00", and the designated time is an absolute time. Thus, the determination result of step S1101 becomes "No".

In a case where the current time is included in the designated time, the determination result of step S1105 becomes "Yes". As a result of the entry satisfying formula (2), the determination result of step S1106 becomes "Yes". Thus, the data store manages the real time statistical data 310 and the data store manages the history statistical data 320 are the candidate data stores.

On the other hand, in a case where the current time is not included in the designated time, the determination result of step S1105 becomes "No". Thus, the data store manages the history statistical data 320 is the candidate data store.

In a case where the candidate data store is the data store manages the real time statistical data 310, the determination result of step S1201 becomes "Yes". In step S1202, there is no entry matching the aggregation unit time, and thus, the determination result becomes "No". In a case where the data store is also the data store managing the history statistical data 320, the determination result of step S1205 becomes "No". By the results above, the request allocation unit 103 issues a request to the database management unit 131.

In a case where the candidate data store is only the data store manages the history statistical data 320, the determination result of step S1201 becomes "No" and the determination result of step S1204 becomes "Yes". In step S1205, there is no entry matching the aggregation unit time, and thus, the determination result becomes "No". By the results above, the request allocation unit 103 issues a request to the database management unit 131.

(Data Obtaining Request of FIG. 13G)

The start time is "2014/02/01 19:00:00" and the end time is "2014/02/01 19:10:00", and the designated time is an absolute time. Thus, the determination result of step S1101 becomes "No".

In a case where the current time is included in the designated time, the determination result of step S1105 becomes "Yes". As a result of the entry satisfying formula (2), the determination result of step S1106 becomes "Yes". Thus, the data store manages the real time statistical data 310 and the data store manages the history statistical data 320 are the candidate data store.

On the other hand, in a case where the current time is not included in the designated time, the determination result of step S1105 becomes "No". Thus, the data store manages the history statistical data 320 is the candidate data store.

In a case where the candidate data store is the data store manages the real time statistical data 310, the determination result of step S1201 becomes "Yes". In step S1202, the process name, aggregation content, and aggregation unit time are not obtained, and thus, the determination result becomes "No". In a case where the candidate data store is also the data store managing the history statistical data 320, the determination result of step S1205 becomes "No". By the results above, the request allocation unit 103 issues a request to the database management unit 131.

In a case where the candidate data store is the data store manages the history statistical data 320, the determination result of step S1201 becomes "No" and the determination result of step S1204 becomes "Yes". In step S1205, the process name, aggregation content, and aggregation unit time are not obtained, and thus, the determination result becomes "No". By the results above, the request allocation unit 103 issues a request to the database management unit 131.

As described above, by the user only setting the designated time, the user can obtain requested data from an appropriate data store.

Figure 14:
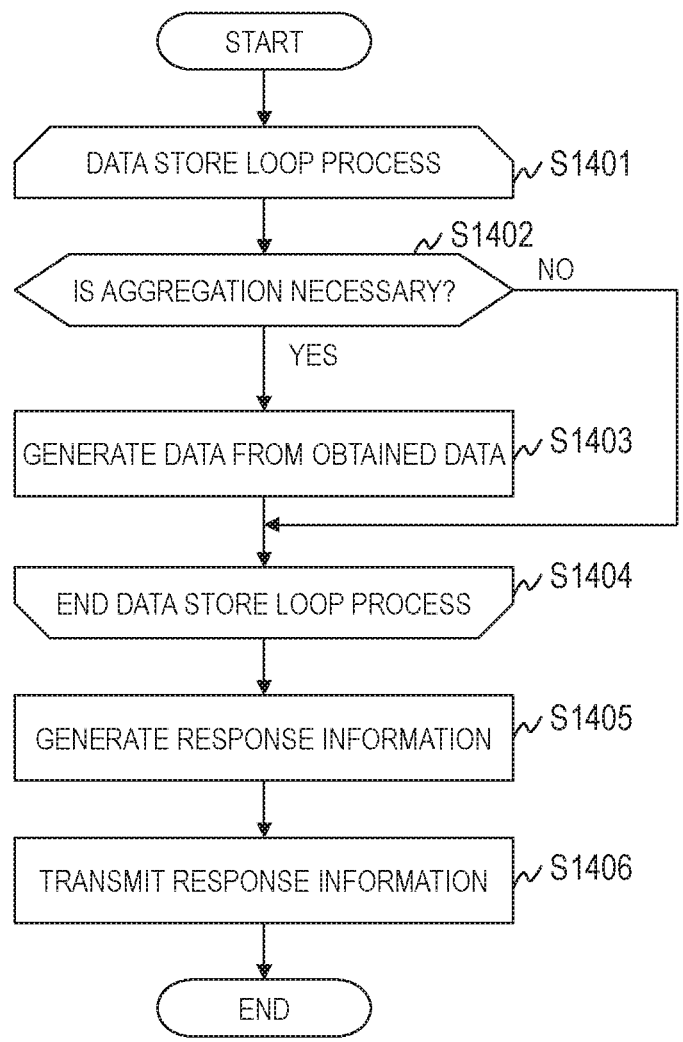
FIG. 14 is a flow chart for illustrating one example of a process executed by an output processing unit of Embodiment 1.

Next, process executed by the output processing unit 104 will be described. FIG. 14 is a flow chart for illustrating one example of a process executed by the output processing unit 104 of Embodiment 1.

After all data has been obtained from the data stores, the output processing unit 104 executes the process described below. The request allocation unit 103 monitors the response to the issued request, and instructs start of the process to the output processing unit 104 in a case of detecting that it has received responses for all issued requests, for example.

The output processing unit 104 starts the looping process of the data store (step S1401). The output processing unit 104 determines whether there is a need to aggregate data obtained from a target data store (step S1402). Specifically, the process below is executed.

The output processing unit 104 determines whether the target data store is the data store manages the real time statistical data 310 or the data store manages the history statistical data 320. In a case where the target data store is the data store manages the raw data 330, the output processing unit 104 determines that there is no need to aggregate the data.

In a case where it is determined that the target data store is the data store manages the real time statistical data 310 or the data store manages the history statistical data 320, the output processing unit 104 refers to the metadata corresponding to the target data store, that is the real time statistical data_metadata 301 or the history statistical data_metadata 302, and obtains a value of the aggregation unit time 404 or a value of the aggregation unit time 505.

The output processing unit 104 determines whether the value of the aggregation unit time 404 or the aggregation unit time 505 is less than the aggregation unit time of the attribute information of the data included in the data obtaining request.

In a case where the value of the aggregation unit time 404 or the aggregation unit time 505 is less than the aggregation unit time of the attribute information of the data included in the data obtaining request, the output processing unit 104 determines that there is a need to aggregate the data. The above is the description of the process of step S1402.

In a case where it is determined that there is no need to aggregate data obtained from the target data store, the output processing unit 104 progresses to step S1404.

In a case where it is determined that there is a need to aggregate data obtained from the target data store, the output processing unit 104 uses the obtained data to generate the requested data (step S1403).

If, for example, the aggregation unit time of the requested data is "1 min" and the aggregation unit time of the data obtained from the data store is "20 sec", the output processing unit 104 generates one piece of requested data by merging three pieces of obtained data. Additionally, the output processing unit 104 reorders the generated requested data in chronological order. The aggregation process may be defined in advance.

The output processing unit 104 determines whether the process has been completed for all data stores from which the data was obtained (step S1404).

In a case where it is determined that the process has not been completed for all data stores from which the data was obtained, the output processing unit 104 selects a new data store (step S1401) and executes a similar process.

In a case where it is determined that the process has been completed for all data stores from which the data was obtained, the output processing unit 104 generates response information (step S1405) and transmits the generated response information to the display unit 141 (step S1406). Then, the output processing unit 104 ends the process.

The output processing unit 104 generates the response information on the basis of a request from the display unit 141. The output processing unit 104 generates graph data, a time chart, and CSV format file data as the response information, for example. In the present embodiment, there is no limitation on the content of the generated response information.

In Embodiment 1, the output processing unit 104 generates the data requested in step S1403, but the database management unit 121 and the database management unit 131 may generate the requested data.

The request allocation unit 103 determines the data aggregation method and instructs the adapter 304 to issue a request including the determined aggregation method, for example. In such a case, the adapter 304 issues a prescribed request in SQL or the like to the database management unit 121 or the database management unit 131. The database management unit 121 or the database management unit 131 obtains data from a database according to the received request, aggregates the obtained data on the basis of a prescribed aggregation method, and transmits the aggregated data to the database management unit 101.

In a case where the database management unit 121 or the database management unit 131 aggregates data, then the process of steps S1401 to S1404 can be omitted.

As described above, according to Embodiment 1, the data store management unit 101 can determine the data store from which to obtain data by analyzing the data obtaining request, and comparing the analysis results with the attributes of the data stored in the data store.

The user can obtain the requested data with ease, because it is not need to set detailed data attributes in the data obtaining request. Also, since there is no need to understand the attributes of data stored in the data store, this enables a reduction in management burden on the user.

Even if there is no requested data in the data stores, the data store management unit 101 can generate the requested data using raw data or the like.

Embodiment 2

In Embodiment 2, the process of a data store management unit 101 will be described for a case in which a new real time aggregation process is added. Below, the description of Embodiment 2 will center on differences from Embodiment 1.

The configuration of the computer system and the hardware and software configurations of the computer 100 in Embodiment 2 are the same as those of Embodiment 1, and thus, descriptions thereof are omitted. The real time statistical data_metadata 301, history statistical data_metadata 302, and raw data_metadata 303 of Embodiment 2 are the same as those of Embodiment 1, and thus, descriptions thereof are omitted. Also, the data store determination process and the request determination process of Embodiment 2 are the same as the processes of Embodiment 1, and thus, descriptions thereof are omitted.

Figure 15:
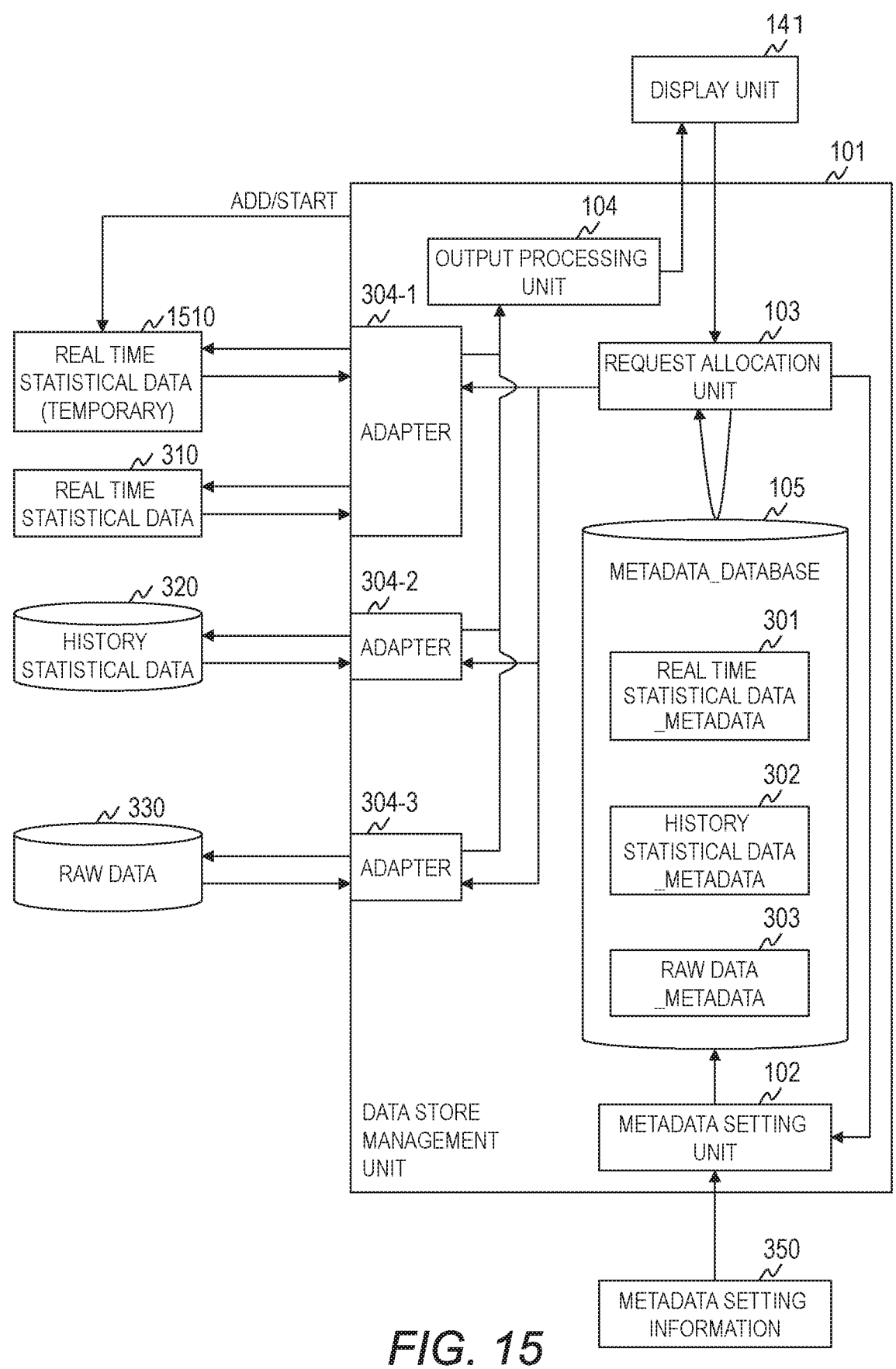
FIG. 15 is a block diagram for showing a process flow of the computer system of Embodiment 2.
Figure 16:
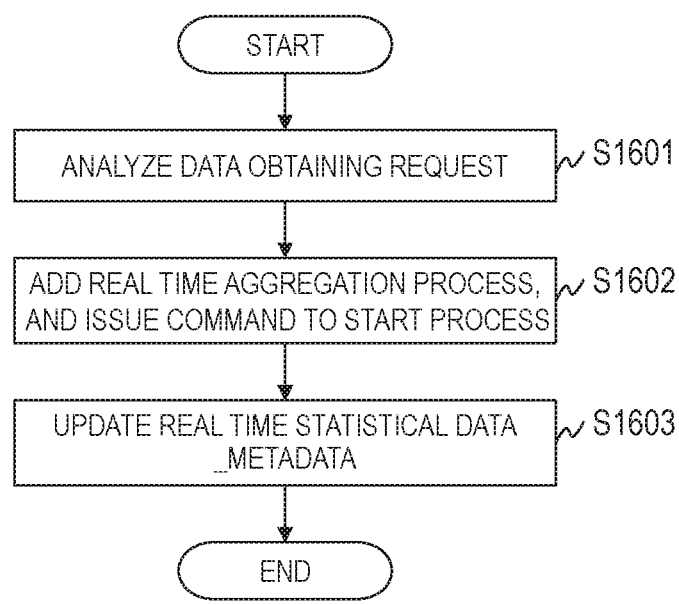
FIG. 16 is a flow chart for illustrating one example of a process executed by the data store management unit of Embodiment 2.

FIG. 15 is a block diagram for showing a process flow of the computer system of Embodiment 2. FIG. 16 is a flow chart for illustrating one example of a process executed by the data store management unit 101 of Embodiment 2.

Embodiment 2 differs from Embodiment 1 in that an aggregation process is temporarily added. At this time, the buffer 112 of the real time data aggregation unit 111 stores exiting real time statistical data 310 and new real time statistical data 1510. The new real time statistical data 1510 is not stored in the history statistical data 320 but is deleted from the buffer 112 after a certain period of time has elapsed.

One method to temporarily add an aggregation process is a method in which the display unit 141 adds a real time aggregation process using a data obtaining request. One possible method to do so is to temporarily add the real time aggregation process when performing a drill down on data currently being referenced, for example. Here a process executed by the data store management unit 101 of Embodiment 2 will be described with reference to FIG. 16.

The data store management unit 101 starts the process in a case of receiving a data obtaining request from the display unit 141. First, the request allocation unit 103 of the data store management unit 101 analyzes the received data obtaining request (step S1601). In a case where the received data obtaining request is a request such as shown in FIG. 13A, then the request allocation unit 103 executes the process indicated in Embodiment 1.

Here, it is assumed that a data obtaining request for instructing the addition of a new aggregation process has been received. The data obtaining request includes a process name, content of the real time statistical data 310, an aggregation content, an aggregation unit time, and a retention time. Also, the request allocation unit 103 outputs an update instruction including the analysis results of the data obtaining request to the metadata setting unit 102.

The data store management unit 101 instructs a prescribed real time data aggregation unit 111 to add a new real time aggregation process on the basis of the analysis results of the data obtaining request, and to start the real time aggregation process (step S1602).

The metadata setting unit 102 of the data store management unit 101 updates the real time statistical data_metadata 301 on the basis of analysis results of the data obtaining request included in the update instruction (step S1603). The data store management unit 101 then ends the process.

Specifically, the metadata setting unit 102 adds a new entry to the real time statistical data_metadata 301, and on the basis of the analysis results of the data obtaining request sets values for the process name 401, column name 402, aggregation content 403, aggregation unit time 404, and retention time 405 of the added entry.

After the added real time aggregation process has ended, the metadata setting unit 102 of the data store management unit 101 deletes the added entry from the real time statistical data_metadata 301.

In Embodiments 1 and 2, the data store management unit 101, the real time data aggregation unit 111, the history statistical data_database 122, and the raw data_database 132 are realized by different computers, but the configuration is not limited thereto.

The computers 100, 110, 120, and 130 may be virtual computers. Alternatively, one computer may have the data store management unit 101, the real time data aggregation unit 111, the history statistical data_database 122, and the raw data_database 132. Additionally, the computers 100, 110, 120, and 130 may be realized by virtual computers generated on one computer. Also, the computer 100 may have the display unit 141.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, comprising:
a plurality of computers; and
a management computer,
each of the plurality of computers having a first processor, a first memory coupled to the first processor, and a first network interface coupled to the first processor,
the management computer having a second processor, a second memory coupled to the second processor, and a second network interface coupled to the second processor,
wherein a plurality of data stores are formed by using the plurality of computers in the computer system,
wherein each of the plurality of data stores stores data obtained from a data source and having differing attributes,
wherein the management computer has a request allocation unit configured to receive a data obtaining request for obtaining requested data from the plurality of data stores and determine at least one data store from which to obtain the requested data by analyzing the data obtaining request,
wherein the management computer holds metadata management information including a time attribute of data stored in each of the plurality of data stores,
wherein the request allocation unit is configured to:
refer to the metadata management information to select at least one candidate data store based on analysis results of the data obtaining request in a case of receiving the data obtaining request including the time attribute of the requested data;

determine whether the requested data can be obtained from the at least one candidate data store;

determine at least one data store to which to issue a request for obtaining the requested data based on the determination results; and issue the request to the at least one determined data store, wherein the plurality of data stores include:

a first data store that stores real time statistical data calculated by aggregating real time data of a prescribed number of minutes constituting an aggregation unit time, the real time data is obtained from the data source; and a second data store that stores history statistical data that is a history of the real time statistical data, wherein the first data store stores the real time statistical data in a time range from the current time to a time when the retention time is reached, wherein the metadata management information includes first metadata information that manages the retention time pertaining to the real time statistical data stored in the first data store, wherein the time attribute of the requested data included in the data obtaining request includes a designated time indicating the time range of the obtained data, and wherein the request allocation unit is configured to:

determine whether there is a possibility that the requested data can be obtained from the first data store based on the retention time included in the first metadata information and the designated time included in the data obtaining request;

select the first data store as a candidate data store in a case where it is determined that the requested data can be obtained from the first data store; and select the second data store as the candidate data store in a case where it is determined that the requested data cannot be obtained from the first data store.

2. The computer system according to claim 1, wherein the designated time included in the data obtaining request includes a start time and an end time, and wherein the request allocation unit is configured to:

obtain the current time;

calculate a first time by subtracting the retention time included in the first metadata information from the current time;

determines whether the first time is prior to the end time;

select the second data store as the candidate data store in a case where it is determined that the first time is after the end time;

determine whether the first time is after the start time in a case where it is determined that the first time is prior to the end time;

select the first data store as the candidate data store in a case where it is determined that the first time is prior to the start time; and select the second data store as the candidate data store to obtain the requested data from the start time to the first time and select the first data store as the candidate data store to obtain the requested data from the first time to the end time, in a case where it is determined that the first time is after the start time.

3. The computer system according to claim 2, wherein the plurality of data stores include a third data store that stores a history of the real time data obtained from the data source, wherein the first metadata information includes, as first aggregation information, a type and the aggregation unit time of data aggregated when calculating the real time statistical data, wherein the metadata management information includes second metadata information that includes, as second aggregation information, the type and the aggregation unit time of data aggregated when calculating the real time statistical data corresponding to the history statistical data, wherein the data obtaining request includes, as third aggregation information, the type and the aggregation unit time of data for identifying the requested data, and wherein the request allocation unit is configured to:

determine, in a case where the first data store has been selected as the candidate data store, whether a first determination condition is satisfied in which the type of the data of the third aggregation information matches the type of the data of the first aggregation information, and the aggregation unit time of the third aggregation information matches the aggregation unit time of the first aggregation information;

determine the first data store to be the data store to which to issue the request in a case where it is determined that the first determination condition is satisfied;

determine the third data store to be the data store to which to issue the request in a case where it is determined that the first determination condition is not satisfied;

determine, in a case where the second data store has been selected as the candidate data store, whether a second determination condition is satisfied in which the type of the data of the third aggregation information matches the type of the data of the second aggregation information, and the aggregation unit time of the third aggregation information matches the aggregation unit time of the second aggregation information;

determine the second data store to be the data store to which to issue the request in a case where it is determined that the second determination condition is satisfied, and determine the third data store to be the data store to which to issue the request in a case where it is determined that the second determination condition is not satisfied.

4. The computer system according to claim 3, wherein the management computer has an output processing unit configured to generate response information, as a response to the data obtaining request, by using data obtained from the plurality of data stores, wherein the request allocation unit is configured to:

determine, in a case where the first data store has been selected as the candidate data store, whether a third determination condition is satisfied in which the type of the data of the third aggregation information matches the type of the data of the first aggregation information and the aggregation unit time of the third aggregation information is a divisor of the aggregation unit time of the first aggregation information;

determine the first data store to be the data store to which to issue the request in a case where it is determined that the third determination condition is satisfied;

determine the third data store to be the data store to which to issue the request in a case where it is determined that the third determination condition is not satisfied;

determine, in a case where the second data store has been selected as the candidate data store, whether a fourth determination condition is satisfied in which the type of the data of the third aggregation information matches the type of the data of the second aggregation information, and the aggregation unit time of the third aggregation information is a divisor of the aggregation unit time of the second aggregation information;
determine the second data store to be the data store to which to issue the request in a case where it is determined that the fourth determination condition is satisfied; and
determine the third data store to be the data store to which to issue the request in a case where it is determined that the fourth determination condition is not satisfied; and
wherein the output processing unit is configured to:
refer to the first metadata information in a case where data has been obtained from the first data store;
determine whether the aggregation unit time of the data obtained from the first data store is less than the aggregation unit time of the third aggregation information;
generate the requested data by aggregating the data obtained from the first data store in a case where it is determined that the aggregation unit time of the data obtained from the first data store is less than the aggregation unit time of the third aggregation information;
refer to the second metadata information in a case where data has been obtained from the second data store;
determine whether the aggregation unit time of the data obtained from the second data store is less than the aggregation unit time of the third aggregation information;
generate the requested data by aggregating the data obtained from the second data store in a case where it is determined that the aggregation unit time of the data obtained from the second data store is less than the aggregation unit time of the third aggregation information; and
generates response information as a response to the data obtaining request using the requested data.

5. A data access management method in a computer system, including a plurality of computers that store data, and a management computer,
wherein each of the plurality of computers has a first processor, a first memory coupled to the first processor, and a first network interface coupled to the first processor,
wherein the management computer has a second processor, a second memory coupled to the second processor, and a second network interface coupled to the second processor,
wherein a plurality of data stores are formed by using the plurality of computers in the computer system,
wherein each of the plurality of data stores stores data obtained from a data source and having differing attributes,
wherein the management computer has a request allocation unit configured to receive a data obtaining request for obtaining requested data from the plurality of data stores and determine at least one data store from which to obtain the requested data by analyzing the data obtaining request,
wherein the management computer holds metadata management information including a time attribute of data stored in each of the plurality of data stores, and
wherein the data access management method includes:
a first step of referring, by the request allocation unit, to the metadata management information to select at least one candidate data store based on analysis results of the data obtaining request in a case of receiving the data obtaining request including the time attribute of the requested data;
a second step of determining, by the request allocation unit, whether the requested data can be obtained from the at least one candidate data store, and determining at least one data store to which to issue a request to obtain the requested data based on the determination results; and
a third step of issuing the request to the at least one determined data store,
wherein the plurality of data stores include:
a first data store that stores real time statistical data calculated by aggregating real time data of a prescribed number of minutes constituting an aggregation unit time, the real time data is obtained from the data source; and
a second data store that stores history statistical data that is a history of the real time statistical data,
wherein the first data store stores the real time statistical data in a time range from the current time to a time when the retention time is reached,
wherein the metadata management information includes first metadata information that manages the retention time pertaining to the real time statistical data stored in the first data store,
wherein the time attribute of the requested data included in the data obtaining request includes a designated time indicating the time range of the obtained data, and
wherein the first step includes:
a step of determining, by the request allocation unit, whether there is a possibility that the requested data can be obtained from the first data store based on the retention time included in the first metadata information and the designated time included in the data obtaining request;
a step of selecting, by the request allocation unit, the first data store as the candidate data store in a case where it is determined that the requested data can be obtained from the first data store; and
a step of selecting, by the request allocation unit, the second data store as the candidate data store in a case where it is determined that the requested data cannot be obtained from the first data store.

6. The data access management method according to claim 5,
wherein the designated time included in the data obtaining request includes a start time and an end time, and
wherein the first step includes:
a step of obtaining, by the request allocation unit, the current time;
a step of calculating, by the request allocation unit, a first time by subtracting the retention time included in the first metadata information from the current time;
a step of determining, by the request allocation unit, whether the first time is prior to the end time;
a step of selecting, by the request allocation unit, the second data store as the candidate data store in a case where it is determined that the first time is after the end time;
a step of determining, by the request allocation unit, whether the first time is after the start time in a case where it is determined that the first time is prior to the end time;
a step of selecting, by the request allocation unit, the first data store as the candidate data store in a case where it is determined that the first time is prior to the start time;

a step of selecting, by the request allocation unit, the second data store as the candidate data store to obtain the requested data from the start time to the first time and selecting the first data store as the candidate data store to obtain the requested data from the first time to the end time, in a case where it is determined that the first time is after the start time.

7. The data access management method according to claim 6,
wherein the plurality of data stores include a third data store that stores a history of the real time data obtained from the data source,
wherein the first metadata information includes, as first aggregation information, a type and the aggregation unit time of data aggregated when calculating the real time statistical data,
wherein the metadata management information includes second metadata information that includes, as second aggregation information, the type and the aggregation unit time of data aggregated when calculating the real time statistical data corresponding to the history statistical data,
wherein the data obtaining request includes, as third aggregation information, the type and the aggregation unit time of data for identifying the requested data, and
wherein the second step includes:
a step of determining, by the request allocation unit, in a case where the first data store has been selected as the candidate data store, whether a first determination condition is satisfied in which the type of the data of the third aggregation information matches the type of the data of the first aggregation information, and the aggregation unit time of the third aggregation information matches the aggregation unit time of the first aggregation information;
a step of determining, by the request allocation unit, the first data store to be the data store to which to issue the request in a case where it is determined that the first determination condition is satisfied;
a step of determining, by the request allocation unit, the third data store to be the data store to which to issue the request in a case where it is determined that the first determination condition is not satisfied;
a step of determining, by the request allocation unit, in a case where the second data store has been selected as the candidate data store, whether a second determination condition is satisfied in which the type of the data of the third aggregation information matches the type of the data of the second aggregation information, and the aggregation unit time of the third aggregation information matches the aggregation unit time of the second aggregation information;
a step of determining, by the request allocation unit, the second data store to be the data store to which to issue the request in a case where it is determined that the second determination condition is satisfied; and
a step of determining, by the request allocation unit, the third data store to be the data store to which to issue the request in a case where it is determined that the second determination condition is not satisfied.

8. The data access management method according to claim 7,
wherein the management computer has an output processing unit configured to generate response information, as a response to the data obtaining request, by using data obtained from the plurality of data stores,
wherein the second step includes:
a step of determining, by the request allocation unit, in a case where the first data store has been selected as the candidate data store, whether a third determination condition is satisfied in which the type of the data of the third aggregation information matches the type of the data of the first aggregation information, and the aggregation unit time of the third aggregation information is a divisor of the aggregation unit time of the first aggregation information;
a step of determining, by the request allocation unit, the first data store to be the data store to which to issue the request in a case where it is determined that the third determination condition is satisfied;
a step of determining, by the request allocation unit, the third data store to be the data store to which to issue the request in a case where it is determined that the third determination condition is not satisfied;
a step of determining, by the request allocation unit, in a case where the second data store has been selected as the candidate data store, whether a fourth determination condition is satisfied in which the type of the data of the third aggregation information matches the type of the data of the second aggregation information, and the aggregation unit time of the third aggregation information is a divisor of the aggregation unit time of the second aggregation information;
a step of determining, by the request allocation unit, the second data store to be the data store to which to issue the request in a case where it is determined that the fourth determination condition is satisfied; and
a step of determining, by the request allocation unit, the third data store to be the data store to which to issue the request in a case where it is determined that the fourth determination condition is not satisfied, and
wherein the data access management method includes:
a step of referring, by the output processing unit, to the first metadata information in a case where data has been obtained from the first data store;
a step of determining, by the output processing unit, whether the aggregation unit time of the data obtained from the first data store is less than the aggregation unit time of the third aggregation information;
a step of generating, by the output processing unit, the requested data by aggregating the data obtained from the first data store in a case where it is determined that the aggregation unit time of the data obtained from the first data store is less than the aggregation unit time of the third aggregation information;
a step of referring, by the output processing unit, to the second metadata information in a case where data has been obtained from the second data store;
a step of determining, by the output processing unit, whether the aggregation unit time of the data obtained from the second data store is less than the aggregation unit time of the third aggregation information;
a step of generating, by the output processing unit, the requested data by aggregating the data obtained from the second data store in a case where it is determined that the aggregation unit time of the data obtained from the second data store is less than the aggregations unit time of the third aggregation information; and
a step of generating, by the output processing unit, response information as a response to the data obtaining request using the requested data.

* * * * *